Patented Aug. 7, 1945

2,381,205

UNITED STATES PATENT OFFICE 2,381,205

MOLDING POWDER AND METHOD OF MAKING SAME

Robert A. Caughey, Durham, N. H., assignor to University of New Hampshire, Durham, N. H., a corporation of New Hampshire No Drawing. Application March 24, 1942,
Serial No. 436,035

4 Claims. (Cl. 106—163)

The present invention is directed to molded products using ligno-cellulose or other lignin containing material. The invention involves a novel treatment of lignin containing material, such as wood waste, sawdust, bark, peat and similar substances to render the ligno-cellulose plastic and render the lignin therein reactive to chemical treatment with materials, such as amines or other lyotropic substances while preserving the valuable natural properties of the cellulose. By "plastic," I mean capable of being molded or compacted under heat and pressure.

It has been known that lignin containing materials, such as ligno-cellulose, could be rendered plastic and reactive to chemical treatment by boiling with strong acid, alkali or salt solutions at high temperatures and pressures to hydrolyze the ligno-cellulose. Hydrolysis of ligno-cellulose causes a change in its internal structure which is demonstrated by the increase in swelling degree, increased reducing properties, increased water absorption and by X-ray spectrograms. Thus, valuable properties have been sacrificed, such as long chain length of the molecule, low swelling capacity, high fiber strength and low solubility of the treated material.

I have discovered a method by which lignin containing materials, such as ligno-cellulose, can be rendered plastic, and the lignin therein rendered reactive to other chemicals without swelling the fiber materially or losing the fibre strength due to the long-chain molecules, and without substantially increasing the water solubility of the material. This discovery makes it possible to use wood materials, particularly wood waste products, for many purposes for which they have not heretofore been useful.

The treatment of lignin containing materials in accordance with the present invention involves two essential steps (1) uniformly moistening the finely divided material with a diluted acid, and (2) thereafter reducing the moisture content to not more than about one per cent under conditions which do not burst or hydrolyze the fibres substantially. The treated material is then ground to the desired degree of fineness and may be molded under heat and pressure or, before being molded, may be mixed with amines, alcohols or aliphatic esters which are capable of swelling cellulose or ligno-cellulose, and, preferably, are soluble in water. Aldehydes may be added also to impart to the molded article the properties best suited for its intended use.

I will describe my process in its preferred form as I practice it with sulfuric acid. Finely divided ligno-cellulose is moistened at room temperature with at least 35 per cent of its weight of a dilute aqueous sulfuric acid solution containing not more than about 3 per cent sulfuric acid. The amount of solution used should not be excessive but should be sufficient to be uniformly distributed and absorbed, sufficient time being allowed for uniform absorption. The concentration of the solution should be such that the amount of acid absorbed is about 0.75 per cent and not more than 1 per cent of the dry weight of the ligno-cellulose used when freed of its moisture. The ligno-cellulose may be in the form of chips, sawdust, shavings, or wood flour from soft or hard woods or the bark or roots thereof. Some mechanical means may be used for mixing the solution with the finely divided ligno-cellulose to obtain uniform distribution and absorption of the solution.

When the solution of acidic material has uniformly penetrated the wood, the treated material is dried to reduce its moisture content to less than one per cent. The drying process should be carried out at a rate and under controlled humidity conditions causing the least amount of bursting of the fibres and the least hydrolysis of the cellulose. Thus, the drying may be carried out at room temperature or at a slightly elevated temperature at atmospheric pressure or under vacuum. When drying at atmospheric pressure the temperature should not exceed 180° F. and when drying at reduced pressure the temperature should be correspondingly reduced. If the material has been treated properly, its copper number is only slightly increased, indicating that no substantial hydrolysis has taken place. Also, the X-ray diffraction pattern of the dried product indicates that it is a dehydrated lignocellulose. The material thus treated is thermosetting.

After drying, the ligno-cellulose is much more brittle and can be ground much more readily than normal wood. Thus, the grinding requires only about one-quarter of the energy required for grinding normal wood. When ground to the desired degree of fineness, the material may be molded, under heat and pressure with or without the addition of a swelling agent. The material may be molded under pressures between 2000 and 10,000 pounds per square inch and at temperatures, preferably, between 350° F. and 400° F. The time required for curing will vary between 1½ minutes to 10 minutes, depending upon the temperature used. A small amount of a mold lubricant, such as calcium stearate, should be added. It is also desirable, but not necessary, to add a material, such as magnesium oxide or calcium oxide, which acts as a buffering agent to regulate the pH and also acts as a catalyst to control the rate and degree of polymerization during the molding operation. The swelling agent appears to react with the lignin and also to act as a plasticizer for the ligno-cellulose. That swelling agent which will impart to the molded product properties best suited for its intended use should be used. An aldehyde may also be added where increased water resistance is required. In some cases, it is also desirable to add an additional plasticizer.

Swelling agents which may be used, for example, are a simple aliphatic amine, such as dimethylamine; a diamine, such as ethylene diamine and its derivatives; urea, guanidine, or their polymerization products, such as triazine; substances containing alcoholic amino groups, such as glucose amine; aromatic amines such as aniline, benzylamine, or naphthylamine; or heterocyclic compounds, such as pyridine, piperidine, imidazoles, thiocyanates, mono-di or tri-hydroxybenzene, polyvinyl alcohol and polyvinyl acetate.

Such aldehydes or aldehydic substances as formaldehyde, acetaldehyde, acrolein, furfural, hexoses, pentoses, benzaldehyde, or similar substances or their salts, or substances capable of generating these compounds may be used. It is thought that the aldehyde behaves in two ways, namely: first, converts the cellulose portion of the ligno-cellulose to an aldehyde cellulose, which is known to possess reduced swelling capacity and decreased water absorption; and, second, reacts more or less with any unreacted amino groups.

Pigments may be added to obtain a desired color, and fillers, such as ground mica, titanium oxide, graphite, metallic powders, lampblack or cotton flock may be added to obtain desired electrical or other properties.

In the practice of the invention, the desired results may be obtained with various acids. The acid used should not possess oxidizing properties. Thus, a considerable number of organic or inorganic acids are available as well as compounds which are not classified as acids but which have a decided acid reaction. The amounts of different acids required as well as the maximum amounts which can be used vary considerably. Thus, the preferred amount of either sulfuric or phosphoric acid is about 0.75 per cent of the dry weight of the ligno-cellulose used when freed of its moisture but not less than 0.50 nor more than 1.25 per cent should be used. The preferred amount of P-toluene-sulfonic acid is about 0.75 per cent but as much as 2.0 per cent may be used. Oxalic and boric acids may be used in amounts between 1 and 5 per cent and between 5 and 20 per cent respectively. In the case of any given acid, the amount used should be sufficient to accomplish the results desired but should be less than an amount which results in substantial hydrolysis of the cellulose. The degree of hydrolysis varies approximately directly with the hydrogen ion concentration, other conditions being constant. The copper number of the treated dehydrated ligno-cellulose indicates the degree of hydrolysis of the cellulose. The copper number of the treated dehydrated ligno-cellulose of the invention should not be greater than about twice that of the original ligno-cellulose.

Comparative copper number determinations are unreliable unless they are made by the same standard method. The method I have adopted is a modification of that given in "Scott's Standard Methods of Chemical Analysis," 5th ed., vol. II, p. 1913, and is as follows:

Apparatus

The special apparatus required for this test is (1) a grinder which will completely disintegrate the sample without heating or contaminating it and (2) a steam or oil bath which can be maintained at 100° C. The grinder shall be a "Dr. Koerner" type or its equivalent.

The balance used for weighing shall be sensitive to 1 mg.

The glassware used shall be acid- and alkali-resistant.

Reagents

*Solution A.—Copper sulfate solution.*—Dissolve 100 grams of copper sulfate ($CuSO_4.5H_2O$) in water and dilute to 1 liter.

*Solution B.—Carbonate-bicarbonate solution.*—Dissolve 350 grams of sodium carbonate ($Na_2CO_3.10H_2O$) and 50 grams of sodium bicarbonate ($NaHCO_3$) in water and dilute to 1 liter.

*Molybdophosphoric acid.*—Dissolve 100 grams of sodium molybdate ($Na_2MoO_4.2H_2O$) and 75 ml. of phosphoric acid (83%) in a mixture of 275 ml. of concentrated sulfuric acid and 1.75 liters of water.

*Sodium carbonate solution.*—An approximately 5% solution of $Na_2CO_3$ in water.

*Potassium permanganate solution.*—0.05 N.

*Test specimen.*—The specimen for test shall be taken from the test sample in such a way as to be thoroughly representative of it, and shall be completely disintegrated in the grinder.

Procedure

Allow the specimen to come to moisture equilibrium with the atmosphere of the balance. Weight about 0.1 to 0.5 gram (preferably about 0.2 gram) (to nearest 1 mg.) of the ground paper. Weigh at the same time, samples for moisture and ash determinations, and for determinations of such other components as may be found necessary for correction of the copper number. These determinations shall be made by the Tappi standard methods. When mineral filler is present, the weight of it shall be calculated from the ash content. The weight of mineral coating shall be determined likewise, or according to the Tappi standard method.

Immediately before use add 5.0 ml. of Solution A to 95 ml. of B. Bring the mixture to a boil in 2 minutes, and pour it over 1.5 grams of the finely ground sample in a 125-ml. Erlenmeyer flask. Stir well with a glass rod in order to distribute the fibers and to remove air bubbles. Fit the flask with a loosely fitting glass bulb or stopper and submerge completely in a steam bath at atmospheric pressure. Occasionally fibers tend to float to the surface, therefore, the flask should be shaken from time to time to redistribute them. Remove the flask from the steam bath at the end of 3 hours. Filter on an ashless filter paper in a 7.5-cm. Buchner funnel, using suction. Wash by flooding with 100 ml. of 5% $Na_2CO_3$ solution at about 20° C. and then by flooding with 250 ml. of hot water (about 95° C.). Transfer the fibers and filter paper to a small beaker, add 25 ml. of the molybdate solution and macerate well with a flattened glass rod. Transfer to a Buchner funnel again and wash thoroughly with cold water until the blue molybdenum color is removed from the fibers. Dilute the filtrate with water to approximately 700 ml. and titrate it with 0.05 N KMnO₄ to a faint pink.

The copper number is defined as the number of grams of metallic copper in the cuprous oxide reduced from the cupric hydroxide by 100 grams of the test specimen. This is calculated as follows:

$$\text{Copper number} = \frac{6.357 \times \text{ml. KMnO}_4 \times N}{W}$$

where N is the normality of the KMnO₄ and W is the weight in grams of the test specimen after deduction of the weight of the non-cellulosic materials. Correction of the weight of the test specimen shall always be made for moisture and ash. Correction for other components shall be made whenever they are present in significant amounts. Not less than two determinations shall be made and the average of the results shall be reported. Duplicate determinations shall agree within 0.1.

The ligno-cellulose treated in accordance with the invention may be used in fabricating molded products such as panels, flooring material, curved shapes, etc. Its advantages over untreated ligno-cellulose materials, such as wood, lie in the fact that while the valuable properties of the ligno-cellulose or wood, such as fiber strength, impact strength, molecular chain length, etc., remain, the disadvantages of the ligno-cellulose or wood, for example, swelling, checking, warping, and grain, are to a substantial degree removed. The pressures and temperatures at which the molding must be done are reasonably low, and the invention makes possible the utilization of waste wood.

The invention is further illustrated by the following examples:

*Example 1*

Wood in the form of sawdust, shavings or chips ground to pass through a ¼″ mesh screen is moistened with about 35% of its weight of an aqueous sulfuric acid solution containing about 3% of free acid. This treatment is preferably carried out at room temperature and may be considered complete when the acid has uniformly penetrated the wood. In order to reduce the original water content of the wood, as well as to remove the water necessary to get uniform absorption of the acid into the wood, the material is then dried at a temperature not above 180° F. until the moisture content is not more than 1%. After drying, the wood has a slightly darkened appearance, as is the case when wood becomes seasoned or dehydrated. The X-ray diffraction pattern corresponds to that of wood which has been dehydrated over a desiccant like phosphorus pentoxide. Chemical analysis of the ground wood, ground preferably to a finer mesh than 20 mesh, shows no appreciable increase in the swelling degree or reducing power.

*Example 2*

Ground dehydrated wood, as prepared according to Example 1, is mixed with about 1% of calcium stearate which acts as a mold lubricant and is molded at a temperature between 350° F. and 380° F. and a pressure between 2,000 and 5,000 pounds per square inch. The molded piece is dark brown or black in color. A pigment may be added to obtain the desired degree of blackness.

*Example 3*

To obtain special molding compositions which will result in special characteristics in the molded products, ground dehydrated wood, as prepared according to Example 1, is mixed with about 15% of urea and may then be molded and cured at a temperature between 350° F. and 380° F. and a pressure of 2,000 to 5,000 pounds per square inch in from 5 minutes to 1½ minutes depending upon the dimensions of the article being molded. Suitable pigments or mold lubricant may be added in order to modify the properties of the finished product. This material is sufficiently absorbent to permit paint or adhesives to adhere readily.

*Example 4*

Ground dehydrated wood, as prepared according to Example 1, is mixed with about 15% of urea and about the same amount of furfural, and may then be molded and cured as in Example 3.

*Example 5*

Ground dehydrated wood, as prepared according to Example 1, is mixed with about 10% of aniline and about the same amount of furfural, the resulting compound being molded and cured as in Example 3. This material possesses good water resistance.

*Example 6*

Ground dehydrated wood, as prepared according to Example 1, is mixed with about 10% of guanidine and an amount of formaldehyde equivalent to the amount of guanidine used, and the resulting mixture is then molded and cured as in Example 3 after the addition of a suitable mold lubricant, such as calcium stearate.

*Example 7*

Ground dehydrated wood, as prepared according to Example 1, is mixed with about 10% of diphenylamine and an equivalent amount of acetaldehyde, and the resulting mixture, after adding suitable pigments or mold lubricants, may be molded as in Example 3.

*Example 8*

Ground dehydrated wood, as prepared according to Example 1, is mixed with about 10% of pyridine, and the resulting mixture is then molded and cured as in Example 3.

*Example 9*

Ground dehydrated wood, as prepared according to Example 1, is mixed with about 15% ammonium thiocyanate and about the same amount of furfural, and, after adding suitable pigments and mold lubricants, may be molded and cured as in Example 3.

*Example 10*

Ground dehydrated wood, as prepared according to Example 1, is mixed with monohydroxy- dihydroxy- or trihydroxybenzene in amounts of about 10% of monohydroxybenzene, 7% of dihydroxy-benzene or 5% trihydroxy-benzene. The resulting mixture may then be readily molded according to the conditions of Example 3.

*Example 11*

Ground dehydrated wood, as prepared according to Example 1, is mixed with a sufficient amount of magnesium oxide to adjust the pH of the resulting mixture to about 6, in order to control the rate and degree of polymerization as well as the ease of flow of the material when molded under the conditions of Example 3.

Example 12

Ground dehydrated wood, as prepared according to Example 1, and mixed according to any of the examples from 3–10, may be mixed with a buffer such as calcium oxide in an amount to regulate the pH to a value near the neutral point, but slightly on the acid side. The resulting mixture may then be molded under the conditions of Example 3.

Example 13

Ground dehydrated wood, as prepared according to Example 1, may be buffered with calcium oxide or magnesium oxide to a pH between 6 and 6.5, and mixed with about 10% of triphenyl phosphate, and a suitable mold lubricant, and molded and cured according to the conditions given in Example 3.

Example 14

Ground dehydrated wood, prepared according to Example 1, is mixed with about 15% of urea and about the same amount of furfural together with about 10% of cotton flock and molded and cured as in Example 3. The cotton flock increases the tensile and impact strength of the molded article.

Example 15

Ground dehydrated wood, prepared according to Example 1, is mixed with 10% by weight of vinyl acetate. One-half of one per cent of calcium stearate is added and the mixture molded and cured at a pressure of 3500 pounds per square inch and a temperature of 345° F. for about 2½ minutes.

I claim:

1. The method of making a moldable lignocellulose having an X-ray diffraction pattern characteristic of dehydrated wood which comprises treating a mass of small pieces of wood with an amount of a non-oxidizing dilute aqueous solution of an acidic material sufficient to be uniformly absorbed thereby by mixing until the solution is uniformly distributed therein, and drying the material containing the absorbed solution until its moisture content is not more than about one per cent by heating under atmospheric conditions at a temperature not exceeding 180° F. to produce a dried material the copper number of which is not more than about twice that of the original untreated wood, the amount of acidic material absorbed by the wood being such that the concentration of the solution is increased sufficiently during the drying operation to exert a dehydrating action upon the cellulose while the non-oxidizing characteristics of said solution are substantially maintained.

2. The method of making a moldable composition which comprises treating a mass of small pieces of a cellulosic material containing lignin by mixing with a volume of an aqueous solution of sulfuric acid sufficient to be uniformly absorbed thereby by mixing until the solution is uniformly distributed therein, said volume of solution containing between 0.50 and 1.25 per cent of sulfuric acid based upon the weight of the cellulosic material, and drying the treated material under atmospheric conditions at a temperature not exceeding 180° F.

3. The method of making a moldable composition which comprises treating a mass of small pieces of a cellulosic material containing lignin by mixing with a volume of an aqueous solution of oxalic acid sufficient to be uniformly absorbed thereby by mixing until the solution is uniformly distributed therein, said volume of solution containing between 1 and 5 per cent of oxalic acid based upon the weight of the cellulosic material, and drying the treated material under atmospheric conditions at a temperature not exceeding 180° F.

4. The method of making a moldable composition which comprises treating a mass of small pieces of a cellulosic material containing lignin by mixing with a volume of an aqueous solution of phosphoric acid sufficient to be uniformly absorbed thereby by mixing until the solution is uniformly distributed therein, said volume of solution containing between 0.50 and 1.25 per cent of phosphoric acid based upon the weight of the cellulosic material, and drying the treated material under atmospheric conditions at a temperature not exceeding 180° F.

ROBERT A. CAUGHEY.